March 14, 1961

H. L. HOWARD 2,974,752

POSITIVE PARKING BRAKE

Filed Sept. 3, 1957

INVENTOR.
Harold L. Howard
BY
W. C. Middleton
ATTORNEY.

March 14, 1961

H. L. HOWARD 2,974,752

POSITIVE PARKING BRAKE

Filed Sept. 3, 1957

INVENTOR.
Harold L. Howard
BY
W. C. Middleton
ATTORNEY.

United States Patent Office 2,974,752
Patented Mar. 14, 1961

2,974,752

POSITIVE PARKING BRAKE

Harold L. Howard, Lansing, Mich., assignor to General Motors Corporation, Detroit, Mich., a corporation of Delaware Filed Sept. 3, 1957, Ser. No. 681,495

10 Claims. (Cl. 188—69)

This invention relates generally to brake mechanisms and particularly to improvements in parking brakes for motor vehicles.

Because, in general, parking brake mechanisms are intended only to maintain a vehicle stationary, positive type brakes have been found adequate. Usually, the brake is operated by rather complex linkage comprising multiple links and levers needed to afford the required leverage for minimum operator effort. However, with multiple links and levers, manufacturing tolerances induce large variations in the linkage so that, frequently, between different mechanism, extremes are encountered where the brake will not remain engaged or cannot be disengaged. In order to correct for these extremes, it is necessary to restrict permissive tolerances, hence, inducing an added cost into each mechanism.

With the foregoing in mind, the invention contemplates a parking brake mechanism that is power operated and therefore does not require any operator effort other than that necessary to turn the power on and off, that is a compact structural unit capable of easy installation, that requires a minimum of power to effect a yieldable engagement by a novel arrangement which is relatively free of frictional losses, that cuts off the power after the brake position is established, and that is disengageable without use of power by utilizing means inherently available from the construction.

By the invention, a unique disposition of electrically operated solenoids enforces, by an actuator, a yieldable engagement of a toothed locking element with a toothed locking member to prevent rotation of an associated rotatable member. The locking element and the locking gear are provided with tooth side angles selected to encourage disengagement under load and, therefore, when the locking element is released, disengagement is effected without utilizing any outside power source. In addition, the solenoids, when operated, actuate synchronized switches which cut off electric current after the brake position is established and then one of the solenoids maintains the toothed locking element engaged.

Specifically, the invention affords a novel actuator which during one phase of operation moves a locking element to a brake position and during another phase permits movement away from this position. The actuator includes rollers which are carried along a guide surface to effect movement of the locking element towards the brake position with the resultant rolling action reducing frictional losses in the mechanism.

According to one form of the invention, a toothed locking pawl is pivotally mounted for engagement with a locking gear which is connected to a rotatable member. A cam surface on the pawl is located adjacent a fixed guide surface and these surfaces coact with rollers carried by an actuator for the pawl. When a manual selector control is operated, both a primary and a secondary solenoid are energized with the latter allowing the former to move the actuator along the guide surface whereupon rolling action between the rollers and the pawl cam surface causes the pawl to move towards the brake position. If the teeth are not aligned on the pawl, a yieldable take-up connection becomes operative permitting the primary solenoid to continue operation until completion of the pawl engaging stroke. Near the end of the stroke, synchronized switches are actuated first to de-energize the secondary solenoid so as to hold the pawl actuator in the brake position and then to de-energize the primary solenoid. To remove the pawl from the brake position, the selector control is again operated energizing the secondary solenoid only. Consequently, the primary solenoid will permit the actuator to be withdrawn from the brake position freeing the pawl for disengaging movement.

The foregoing and other objects and advantages of the invention will be apparent from the following description and the accompanying drawings, in which:

Figure 4 is a schematic diagram of an electric control system for operating the brake mechanism.

Figure 1:
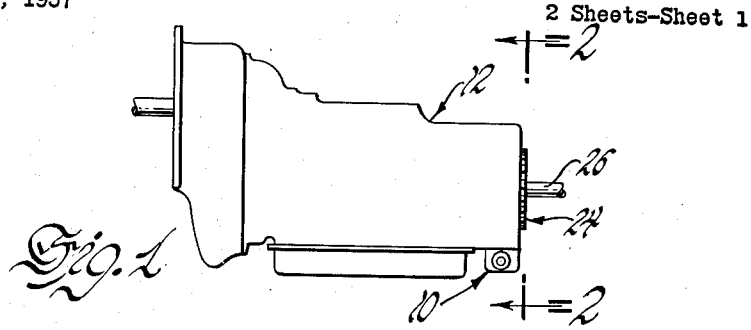
Figure 1 is a view of a transmission incorporating a parking brake mechanism constructed according to the invention.

Referring to the drawings and particularly Figure 1, a brake mechanism 10 embodying the principles of the invention is illustrated installed in a transmission, designated generally at 12. A locking element, such as a toothed locking pawl 14, is pivotally mounted on a stub shaft 16, in turn, attached to a casing 18 for the transmission. A tooth 20 on the pawl 14 is arranged to intermesh with a series of peripherally spaced teeth 22 on a locking member, e.g., locking gear 24. The locking gear 24 is appropriately secured to an output shaft 26 for the transmission so that with the pawl tooth 20 engaged with the teeth 22 on the locking gear 24 the vehicle is restrained from movement. Preferably, the tooth side angles (a), depicted in Figure 3, on both the pawl 14 and the locking gear 24 are arranged to effect a disengagement as a result of the tooth loads whenever the pawl is released. If desired, the angles (a) may be selected to maintain engagement under load and the pawl 14 may be disengaged by another agency, such as a spring 28 which may be heavily preloaded. In the preferred embodiment, the spring 28 is of the torsion type with one arm grounded to the casing 18 and an opposite arm engaging the pawl 14 in a manner that exerts a bias for urging the pawl out of the engaged position against a stop 30 afforded by the casing 18. In this instance, the spring 28 need not be heavily preloaded but, since the main function is to hold the pawl 20 against the stop 30 and to effect a disengagement when there is an absence of a load to cause such, may be relatively lightly loaded.

Movement of the pawl 14 to the engaged position is accomplished by an actuator, indicated at 32, comprising a carrier end 34 and a rod end 36. Laterally extending from the carrier end 34 are oppositely disposed side slots 38 in which are freely positioned rollers 40 and 42. Roller 40 is in engagement with a guide surface 44 affixed to the casing 18 while the roller 42 is in engagement with a cam surface 46 provided on the back of the pawl 14. The disposition of the rollers 40 and 42 is such that the rollers may move sidewise, i.e., transverse to the direction of movement of the actuator 32. When the actuator 32 is moved downwardly from the Figure 2 position, roller 40 will be moved laterally inwardly by the guide surface 44 and, consequently, due to the peripheral engagement with the opposite roller 42, cause roller 42 to similarly move laterally but outwardly against the cam surface 46 and move the pawl 14 to the engaged position demonstrated in Figure 3. When the actuator 32 is moved upwardly to the Figure 2 position, the roller 40 can move laterally outwardly along the guide surface 44 and, therefore, permits inward movement of the roller 42 so that the pawl 14 can be disengaged, both by the spring 28 and the load aspect of the coacting pawl and gear teeth 20 and 22. The extent of movement of the actuator to the Figure 2 position is, of course, limited to insure that the rollers cannot move out of the confinement of the side slots 38. By utilizing rollers 40 and 42 rolling action relatively free of friction is obtained, hence reducing resistance otherwise existing that tends to interfere with engagement of the pawl 14.

Figure 3:
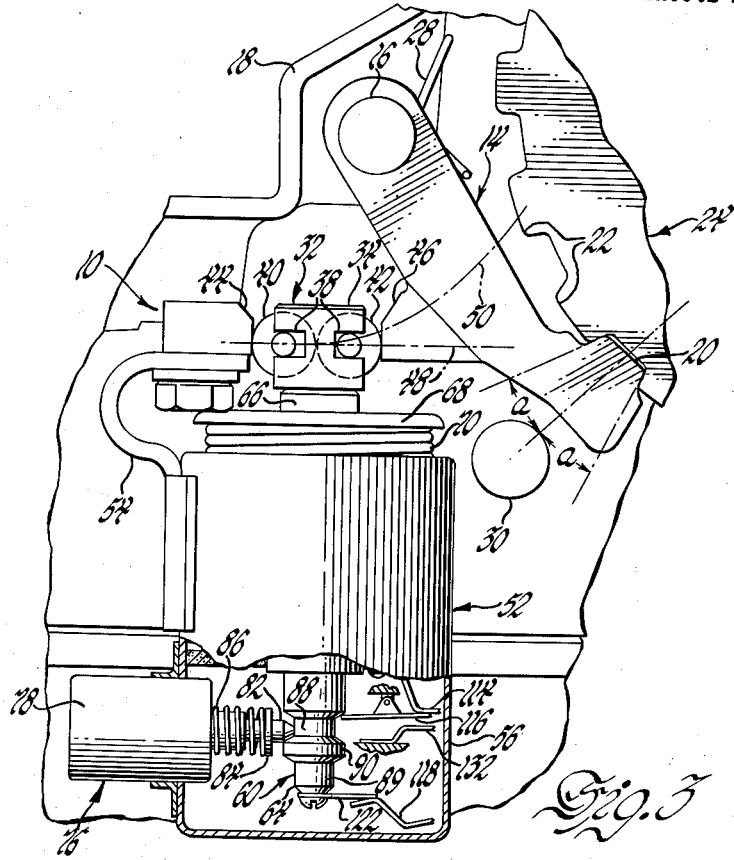
Figure 3 is a view similar to Figure 2 depicting the brake mechanism in the parked or engaged position.
Figure 2:
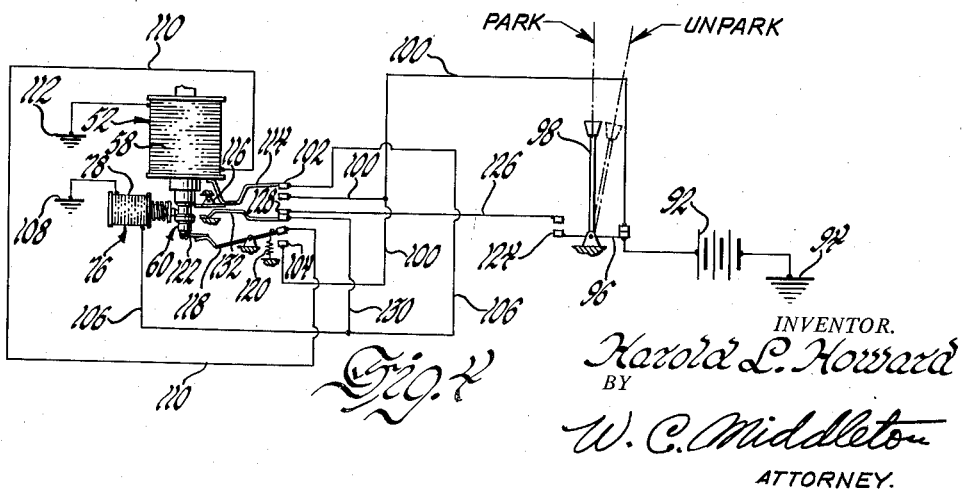

As best seen in Figure 3, when the actuator 32 is in the position locking the pawl 14 into engagement with the locking gear 24 the rollers 40 and 42 are positioned on the straight portion of the respective surfaces 44 and 46 and establish with the optimum condition a substantially straight line 48 which is tangent to an arc traversed by rotational movement of a point 50 on the pawl 14. This arrangement affords a positive strut that resists disengagement of the pawl 14 whenever the transmission output shaft 26 attempts to rotate in either direction.

Figure 2:
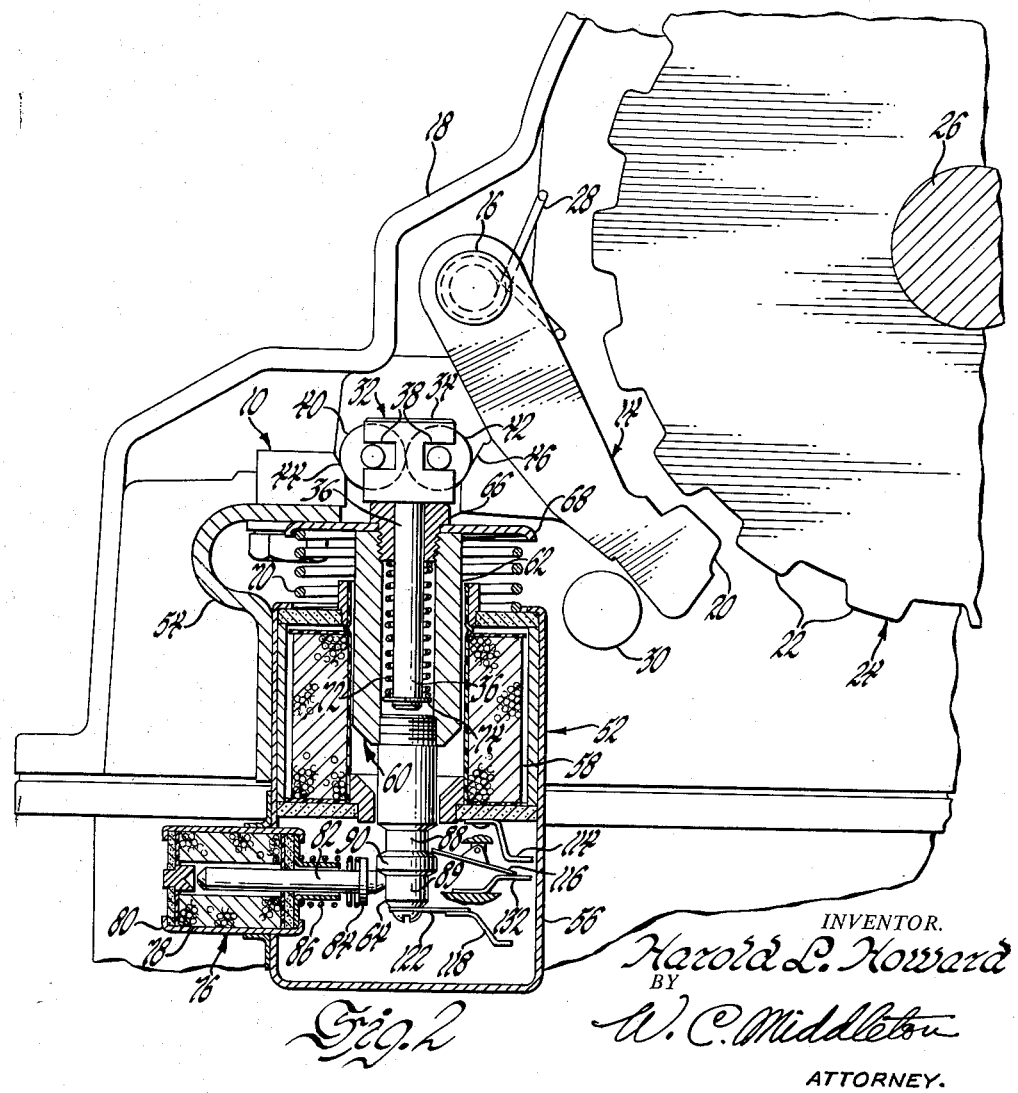
Figure 2 is a sectional view along line 2—2 of Figure 1 demonstrating the brake mechanism in the unparked or disengaged position.

The actuator 32 is moved to the Figure 2 and 3 positions by a primary solenoid 52 mounted on a bracket 54 secured to the casing 18. An outer housing 56 for the solenoid 52 encloses a coil 58 which, in turn, surrounds an armature 60. Armature 60 is composed of a hollow sleeve 62 and an attached switch control stem 64. A bushing 66 is threadedly engaged to the upper end of the hollow sleeve 62 and clampingly positions an annular flange 68 on the sleeve. A pawl disengaging coil spring 70 is interposed between the flange 68 and the solenoid housing 56 for urging the armature upwardly to the Figure 2 position whenever the solenoid 52 is de-energized in a manner to be described. The rod end 36 of the actuator 32 is slidable within the bushing 66 and is urged downwardly against the bushing 66 by a spring 72 positioned on the rod end 36 between the bushing 66 and a collar 74. The function of the spring 72 is to afford a yieldable connection between the primary solenoid 52 and the actuator 32. For example, if the pawl tooth 20 and the gear teeth 22 are misaligned when it is desired to engage the pawl 14, the armature 60 will be drawn downwardly in a known way, upon energization of the solenoid 52, by the resultant attraction created between the coil 58 and the flange 68. Since the roller 42 is prevented from moving laterally outwardly, the actuator 32 will remain stationary while the armature 60 is moved and the spring 72 will be compressed until such time as the coacting teeth are aligned whereupon the spring 72 will cause a quick engagement.

Positioned below the primary solenoid 52 and mounted on the outer housing 56 thereof is a secondary solenoid 76, similar structurally to the primary solenoid 52. A coil 78 for the secondary solenoid 76 is enclosed by an outer shell 80 and surrounds a movable armature 82 on one end of which is provided a flange 84. Located on the armature 82 between the shell 80 and the flange 84 is a spring 86 that exerts a force for urging the armature 82 to the Figure 2 position when the solenoid 76 is de-energized. As seen in Figures 2 and 3, the armature switch control stem 64 for the primary solenoid 52 has upper and lower annular recesses 88 and 89, respectively, separated by an intermediate control land 90. When the secondary solenoid 76 is de-energized, the armature 82 therefor will engage the bottom side of the control land 90 and prevent movement of the primary solenoid armature 60 and, accordingly, the actuator 32 to the engaged position for the pawl 14.

The electrical control system for operating the mechanism 10 is diagrammatically illustrated in Figure 4 and utilizes a battery 92 as a source of electric current. The battery 92 has one terminal extending to ground at 94 and the opposite terminal connected to a main switch 96 is suitably operated by an appropriate manually operated selector, e.g., a selector lever 98 positionable in the settings designated Park and Unpark. Extending from the switch 96 is a supply conductor 100 which is connected to both a secondary solenoid control switch 102 and a primary solenoid control switch 104.

From switch 102, a conductor 106 extends to the secondary solenoid coil 78 and then to ground at 108 while switch 104 has a conductor 110 connected to the primary solenoid coil 58 grounded at 112. Switch 102 has connected at one end a suitably insulated switch arm 114 of spring material which is normally biased by the spring effect to the switch closed position and which is moved to the switch opened position by lever 116 pivotally mounted on the primary solenoid housing 56. When the primary solenoid armature 60 is moved downwardly a predetermined distance to the pawl engaged position, depicted in Figure 3, the lever 116 will be rotated by the engagement of the end of lever 116 with the upper side of the recess 88 and, therefore, the opposite end will force the switch arm 114 to the switch open position. As a result, the switch 102 will open de-energizing the secondary solenoid 76 whereupon the armature 82 will be moved by the spring 86 into the recess 88, as viewed in Figure 3, and maintain solenoid 52 in the pawl engaged position.

Switch 104 inccludes a pivotally mounted switch arm 118 biased by a spring 120 to the switch closed position. Switch arm 118 is suitably insulated and is actuated by an arm 122 attached to the bottom end of the switch control stem 64 of the armature 60 for the primary solenoid 52. The same downward movement of the armature 60 which opens switch 102 will, subsequently, cause the arm 122 to pivot switch arm 118 to the switch open position and interrupt the supply of power to the primary solenoid 52 effecting a de-energization thereof.

When the selector lever 98 is moved to the Unpark or pawl disengaged position, the main switch 96 is open and an auxiliary adjacent switch 124 associated therewith is closed. Auxiliary switch 124 then completes a circuit extending from the battery 92 through a conductor 126 to a supplementary switch 128, which, when closed, completes a circuit via a branch conductor 130 and conductor 106 to the coil 78 for the secondary solenoid 76. Supplementary switch 128 is similar structurally to the switch 102 and comprises an appropriately insulated switch arm 132, also of spring material, the effect of which is to normally close switch 128. The switch 128 is opened when the armature 60 moves upwardly a sufficient distance towards the pawl disengaged position to enable the control land 90 to engage the end of the lever 116 and cause rotary movement thereof. Due to this rotary movement, the opposite end of the lever 116 will engage the switch arm 132 and open switch 128.

To summarize the operation of the brake mechanism 10, assume initially that the brake mechanism is in the Figure 2 pawl disengaged position and, accordingly, that the selector lever 98 is in the corresponding pawl disengaged or Unpark position. Movement of the selector lever 98 to the Park position will close the main switch 96 and since both the switch 102 and the switch 104 are closed, the circuits for each of these solenoids will be completed and cause energization thereof. The solenoid 76 will move the armature 82 out of recess 89 and the interfering position with the control land 90 illustrated while the primary solenoid 52 will cause the armature 60 and, consequently, the actuator 32 to be drawn downwardly whereupon the coaction of the rollers 40 and 42 with their respective surfaces 44 and 46 will rotate the pawl 14 to the engaged position with respect to the locking gear 24. As mentioned before, if the pawl tooth 20 and the gear teeth 22 are misaligned, the spring 72 will permit completion of the downward stroke of the armature 60 and the actuator 32 will remain stationary until an alignment occurs. As the armature 60 moves downwardly almost to the completion of the stroke, the switch control stem 64 becomes effective to first cause an engagement of the upper side of the recess 88 with the lever 116 so that the switch 102 is opened de-energizing the secondary solenoid 76. The spring 86 will promptly move the armature 82 outwardly and into the recess 88 preventing removal of the armature 60 and actuator 32 by the pawl disengaging spring 70 to the pawl disengaged position. An instant later, the arm 122 will engage the switch arm 118 and open the switch 104. The primary solenoid 52 now is de-energized and the vehicle is parked without further need of electric power to maintain the engaged status of the pawl illustrated by Figure 3.

When the operator wishes to disengage the brake mechanism 10, the selector lever 98 is moved to the Unpark or disengaged position which opens main switch 96 and closes the auxiliary switch 124. Since the supplementary switch 128 is closed, a circuit extending from auxiliary switch 124 through conductor 126, supplementary switch 128, branch conductor 130 and conductor 106 to the secondary solenoid 76 is completed and the solenoid 76 becomes energized. The armature 82 is withdrawn from the recess 88 and, subsequently the spring 70 will move the armature 60 and, accordingly, the actuator 32 upwardly to the pawl disengaged position. The rollers 40 and 42 will move along the guide surface 44 and permit the pawl 14 to be ejected from engagement with the locking gear 24, if the load on the transmission output shaft 26 is adequate. If not, the ejection will be accomplished by the pull-out spring 28 which will force the pawl 14 against the stop 30. Near the end of the travel of the armature 60 upwardly, the upper side of the control land 90 will engage the end of the lever 116 and cause it to rotate into engagement with the switch arm 132 and open the switch 128. The circuit for the solenoid 76 will be interrupted and, accordingly, the solenoid 76 de-energized. The armature 82 will be moved outwardly by the spring 86 to the Figure 2 position in which engagement with the recess 88 prevents subsequent movement of the armature 60 to the pawl engaged position. Both the switches 102 and 104 are allowed to close due to their respective spring forces, but, since the switch 96 is open, they are ineffective to control the related solenoids. The pawl 14 is now in the Figure 2 position prepared for the engagement cycle described above.

From the foregoing it can be seen that the control system for the brake mechanism is arranged to supply power for engaging the brake which is subsequently cut off after completion of the engagement insuring that there is not a constant use of the electrical source. Furthermore, the power source is not required to cause a disengagement but only to actuate the secondary solenoid 76 which maintains either engaged or disengaged status of the pawl 14. By utilizing the rolling action, the forces required to operate the mechanism are reduced which, with the inherent load disengaging characteristics of the teeth on the pawl 14 and the locking gear 24, permits employment of a smaller primary solenoid 52.

The invention is to be limited only by the following claims.

I claim:

1. In a brake mechanism, the combination of a rotatable member, a locking member connected to the rotatable member, a locking element pivotally mounted for movement into engagement with the locking member to prevent rotation of the rotatable member, the locking element including a cam surface thereon, a guide surface spaced from the locking element cam surface, an actuator for the pawl including a first roller engageable with the guide surface and a second roller engageable with the pawl cam surface, and electrical means for moving the actuator with the rollers along the guide and cam surfaces to a position in which the axes of the rollers establish a line substantially tangent to the locking element cam surface and the guide surface so as to resist movement of the locking element away from the locking member, the electrical means having yieldable and positive connections for moving the actuator respectively to said position and from said position.

2. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including first and second rollers supported thereon for revolvable movement, the first roller being engageable with the guide surface and the second roller being engageable with the pawl cam surface, a primary solenoid including an armature for yieldably moving the actuator along the guide surface when energized to a first position in which the pawl is moved towards the engaged position biasing means for moving the actuator with the rollers along the guide and cam surfaces when the primary solenoid is de-energized to a second position in which the pawl is permitted to move from the engaged position, stop means on the primary solenoid armature, a secondary solenoid including an armature biased into engagement with the stop means on the primary solenoid armature when de-energized to maintain the actuator in one of the positions thereof and withdrawn from engagement therewith when energized, a source of electric power, control switches interconnecting the source, respectively, with the primary and secondary solenoids, the primary solenoid armature in moving to the first position opening both switches to de-energize the solenoids and in moving to the second position allowing both switches to close and permit energization of the solenoids by the source.

3. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including first and second rollers supported thereon for both revolvable and transverse movement, the latter movement being relative to the direction of movement of the actuator, the first roller being engageable with the guide surface and the second roller being engageable with the pawl cam surface, a primary solenoid including an armature for yieldably moving the actuator along the guide surface when energized to a first position in which the pawl is moved towards the engaged position, biasing means for moving the actuator with the rollers along the guide and cam surfaces when the primary solenoid is de-energized to a second position in which the pawl is permitted to move from the engaged position, stop means on the primary solenoid armature, a secondary solenoid including an armature biased into engagement with the stop means on the primary solenoid armature when de-energized to maintain the first and second positions thereof and withdrawn from engagement therewith when energized, a source of electric power, control switches interconnecting the source, respectively, with the primary and secondary solenoids, the primary solenoid armature in moving to the first position initially opening the control switch for the secondary solenoid to de-energize the secondary solenoid and subsequently opening the control switch for the primary solenoid to de-energize the primary solenoid and in moving to the second position allowing both switches to close and permit energization of the solenoid by the source.

4. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including first and second rollers supported thereon for both revolvable and transverse movement, the latter movement being relative to the direction of movement of the actuator, the first roller being engageable with the guide surface and a second roller being engageable with the pawl cam surface, a primary solenoid including an armature for yieldably moving the actuator along the guide surface when energized to a first position in which the pawl is moved towards the engaged position and for moving the actuator with the rollers along the guide and cam surfaces when de-energized to a second position in which the pawl is permitted to move from the engaged position, biasing means for urging the primary solenoid armature to the second position, stop means on the primary solenoid armature, a second solenoid including an armature biased into engagement with the stop means on the primary solenoid armature when de-energized to maintain the first and second positions thereof and withdrawn from engagement therewith when energized, a source of electric power, control switches for the primary and secondary solenoids, a selector switch operable for connecting and disconnecting the control switches with the source, the primary solenoid armature in moving to the first position initially opening the control switch for the secondary solenoid to de-energize the secondary solenoid and subsequently opening the control switch for the primary solenoid to de-energize the primary solenoid and in moving to the second position allowing both switches to close and permit energization of the solenoids when the selector switch is operated to connect the control switches with the source, and a supplementary switch rendered operative when the primary solenoid armature is in the first position and the selector switch is operated to disconnect the control switches with the source to cause energization of the secondary solenoid and allow the biasing means to move the primary solenoid armature to the second position.

5. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including first and second rollers supported thereon for both revolvable and transverse movement, the latter movement being relative to the direction of movement of the actuator, the first roller being engageable with the guide surface and the second roller being engageable with the pawl cam surface, a primary solenoid including an armature for moving the actuator with the rollers along the guide and cam surfaces to move the pawl towards the engaged position and to permit the pawl to move from the engaged position, the armature being provided with stop means, biasing means so arranged relative to the primary solenoid armature and the actuator as to afford yieldable and positive connections therebetween when the pawl is moved respectively to the engaged position and from the engaged position, a secondary solenoid arranged to co-operate with the stop means so as to maintain the pawl in the engaged position, and means for urging the pawl from the engaged position.

6. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including a first roller engageable with the guide surface and a second roller engageable with the cam surface, a primary solenoid including an armature for yieldably moving the actuator along the guide surface when energized to a first position in which the pawl is moved towards the engaged position and for moving the actuator with the rollers along the guide and cam surfaces when de-energized to a second position in which the pawl is permitted to move from the engaged position, biasing means so arranged relative to the primary solenoid armature and the actuator as to afford yieldable and positive connections therebetween when the pawl is moved respectively to the engaged position and from the engaged position, means urging the pawl from the engaged position, stop means on the primary solenoid armature, a secondary solenoid including an armature biased into engagement with the stop means on the primary solenoid armature when de-energized so as to maintain the actuator in one of the positions thereof and withdrawn from engagement therewith when energized, and means including a source of electric power for energizing and de-energizing the solenoids.

7. In a brake mechanism, the combination of a rotatable member, a locking gear connected to the rotatable member, a pawl mounted for pivotal movement into engagement with the locking gear to prevent rotation of the rotatable member, the pawl including a cam surface thereon, a guide surface spaced from the pawl cam surface, an actuator for the pawl positioned adjacent both the guide and cam surfaces for movement relative thereto, the actuator including first and second rollers supported thereon for both revolvable and shiftable movement relative thereto, the shiftable movements of the rollers on the actuator being transverse to the direction of actuator movement so that the first and second rollers engage respectively the guide and cam surfaces, the cam and guide surfaces having first portions thereon so shaped as to permit the shiftable movement of the rollers and second portions thereof so shaped as to be in substantially parallel alignment and thereby restrict the shiftable movement of the rollers, and means moving the actuator with the rollers along the guide and cam surfaces so as to move the pawl towards the locking gear and so as to permit the pawl to move away from the locking gear, the rollers when traveling along the first portions of the cam and guide surfaces permitting, due to the shiftable roller movement, the pawl to move away from the locking gear and when positioned along the second portions of the cam and guide surfaces holding, due to the substantially parallel alignment between the second portions, the pawl in engagement with the locking gear.

8. In a brake mechanism, the combination of a rotatable member, a locking gear connected to the rotatable member, a pawl mounted for pivotal movement into engagement with the locking gear to prevent rotation of the rotatable member, the pawl including a cam surface thereon, a guide surface spaced from the pawl cam surface, an actuator for the pawl positioned adjacent both the guide and cam surfaces for movement relative thereto, the actuator including first and second peripherally engaged rollers supported thereon for both revolvable and shiftable movement relative thereto, the shiftable movements of the rollers on the actuator being transverse to the direction of actuator movement so that the first and second rollers engage respectively the guide and cam surfaces, the cam and guide surfaces having first portions thereof so shaped as to permit the shiftable movement of the rollers and second portions thereof so shaped as to be in substantially parallel alignment and thereby restrict shiftable movement of the rollers, means moving the actuator with the rollers along the guide and cam surfaces so as to move the pawl towards the locking gear and so as to permit the pawl to move away from the locking gear, and means moving the pawl away from the locking gear, the rollers when traveling along the first portions of the cam and guide surfaces permitting, due to the shiftable roller movement, the pawl to move away from the locking gear and when positioned along the second portions of the cam and guide surfaces holding, due to the substantially parallel alignment between the second portions, the pawl in engagement with the locking gear.

9. In a brake mechanism, the combination of a rotatable member, a toothed locking gear connected to the rotatable member, a toothed pawl mounted for pivotal movement into engagement with the locking gear to prevent rotation of the rotatable member, the pawl including a cam surface thereon, the toothed pawl and the toothed locking gear having tooth side angles so disposed that the pawl and the locking gear tend to disengage under load, a guide surface spaced from the pawl cam surface, an actuator for the pawl positioned adjacent both the guide and cam surfaces for movement relative thereto, the actuator including first and second rollers supported thereon for both revolvable and shiftable movement relative thereto, the shiftable movements of the rollers on the actuator being transverse to the direction of actuator movement so that the first and second rollers engage respectively the guide and cam surfaces, the cam and guide surfaces having first portions thereof so shaped as to permit the shiftable movement of the rollers and second portions thereof so shaped as to be in substantially parallel alignment and thereby restrict shiftable movement of the rollers, means moving the actuator with the rollers along the guide and cam surfaces so as to move the pawl towards the locking gear and so as to permit the pawl to move away from the locking gear, the rollers when traveling along the first portions of the cam and guide surfaces permitting, due to the shiftable roller movement, the pawl to move away from the locking gear and when positioned along the second portions of the cam and guide surfaces holding, due to the substantially parallel alignment between the second portions, the pawl in engagement with the locking gear, a stop for limiting movement of the pawl away from the locking gear, and means for constantly urging the pawl towards the stop.

10. In a brake mechanism, the combination of a rotatable member, a locking gear connected to the rotatable member, a pawl mounted for pivotal movement to and from an engaged position with the locking gear to prevent rotation of the rotatable member, the pawl including a cam surface thereon, a guide surface spaced from the pawl cam surface, an actuator for the pawl including a first roller engageable with the guide surface and a second roller engageable with the pawl cam surface, a primary solenoid adapted to coact with the actuator so as to cause the rollers to travel along the guide and cam surfaces thereby moving the pawl towards the engaged position and also permitting the pawl to move from the engaged position, biasing means so arranged relative to the actuator and the primary solenoid as to afford yieldable and positive connections therebetween when the pawl is moved respectively to the engaged position and from the engaged position, and a secondary solenoid adapted to coact with the actuator so as to cause the pawl to be held in the engaged position.

References Cited in the file of this patent

UNITED STATES PATENTS

| | | |
|---|---|---|
| 1,185,840 | Sears | June 6, 1916 |
| 2,148,240 | La Brie | Feb. 21, 1939 |
| 2,254,115 | Claytor | Aug. 26, 1941 |
| 2,387,449 | Kaman | Oct. 23, 1945 |
| 2,689,029 | McFarland | Sept. 14, 1954 |
| 2,724,461 | Goepfrich | Nov. 22, 1955 |
| 2,860,731 | Hause | Nov. 18, 1958 |